July 15, 1952 D. J. BAKER 2,603,492

NONTORSIONAL STYLUS

Filed Aug. 12, 1946

Inventor
Donald J. Baker

By Ralph B. Stewart
Attorney

Patented July 15, 1952

2,603,492

UNITED STATES PATENT OFFICE 2,603,492

NONTORSIONAL STYLUS

Donald J. Baker, Los Angeles, Calif.

Application August 12, 1946, Serial No. 690,028

9 Claims. (Cl. 274—38)

Figures 1, 2, 3, 4, 5, 6, 7, 8, 9, 10:
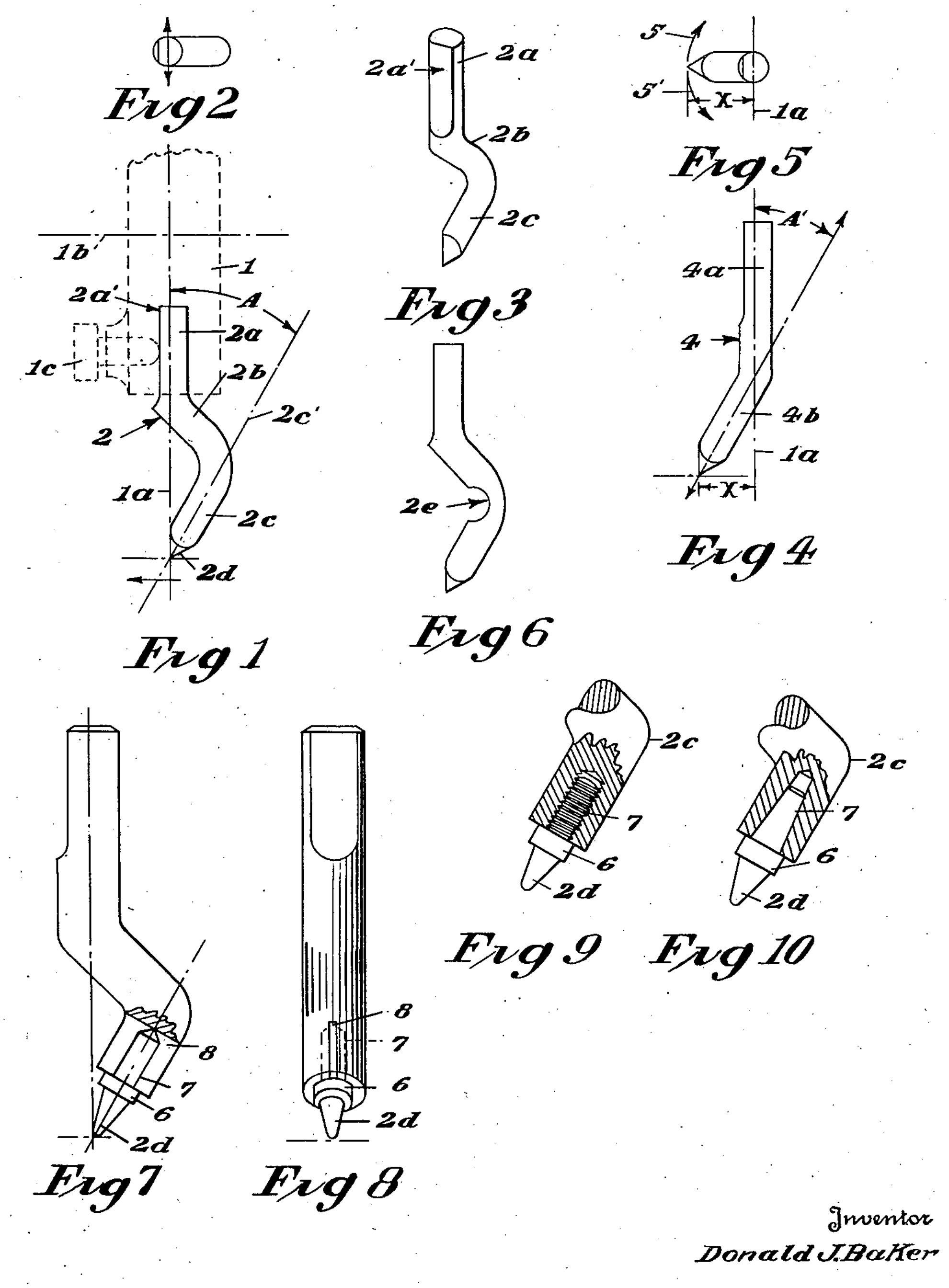

This invention relates to a stylus or needle for sound recording and reproducing units. The stylus is especially designed for use on sound translating devices which may be used both for recording and reproducing sound.

An object of the invention is to devise a stylus for use on lateral-cut records and in which there will be no torsional forces acting on the supporting shank of the needle. A further object is to devise a stylus which may be used both as a recording stylus and a reproducing stylus in a sound translating unit in which the stylus chuck has a vertical axis and oscillates about a horizontal axis. A supplemental object is to provide the proper angle of inclination of the stylus to the surface of the record without introducing torsional forces. Another object is to provide a replaceable tip for the stylus.

Some of the advantages of my stylus include (1) freedom from distortion in recording or reproducing sound due to torsional vibration of the stylus or of the stylus supporting system; (2) the absence of torsional forces acting on the stylus eliminating the tendency of the stylus to become loose in the stylus chuck; (3) better stylus tracking; and (4) reduction in side groove wear on the record.

The preferred form of my invention is illustrated in the accompanying drawing in which Figure 1 is a side elevational view of my improved stylus shown in solid lines and with the supporting chuck shown in dotted lines; Figure 2 is a plan view of the stylus of Figure 1; Figure 3 is a perspective view of the stylus shown in Figure 1; Figures 4 and 5 are side elevational and plan views of a common form of stylus; Figure 5 is a plan view of the stylus of Figure 4; Figure 6 is a side view of another form of my stylus; Figures 7 and 8 are side and front views of my stylus provided with a replaceable tip; and Figures 9 and 10 are fragmentary views showing two other forms of replaceable tips.

It will be understood that the accompanying drawings illustrate the stylus and the supporting chuck on a greatly enlarged scale.

Referring to the drawing, the lower end of a stylus chuck is shown in dotted lines at 1. The chuck has a vertical axis 1*a* and is embodied in a sound translating unit which may be used both for recording and reproducing purposes. The manner of mounting of the chuck is not material to the present invention and will not be described here except to say that it is mounted to oscillate about a horizontal axis indicated at 1*b*. A clamping screw 1*c* is provided at the lower end of the chuck for clamping the stylus 2 in the chuck.

The improved stylus of my invention is formed of a straight vertical shank portion 2*a* at the butt end thereof which extends into the stylus chuck 1 coaxially with the axis 1*a* of the chuck, an intermediate portion 2*b* extending at an angle to the chuck axis 2*a*, a straight portion 2*c* adjacent the tip end of the stylus and arranged at an angle A to the axis 1*a*, and a record-engaging point 2*d* which terminates on the axis 1*a*. The shank portion 2*a* has a flat face 2*a'* against which the clamping screw 1*c* presses.

The entire stylus may be formed of a single rod of metal of a uniform stock throughout, or the portions 2*a*, 2*b* and 2*c* may be formed of metal and the point 2*d* formed of sapphire or other suitable material. The point 2*d* is preferably formed as a conical point symmetrical about the axis 2*c'*. This type of point is suitable either for embossing purposes or for reproducing purposes.

For the purpose of explaining the advantage of my improved stylus, I have shown in Figures 4 and 5 one form of stylus which has been in common use on sound translating elements provided with a stylus chuck having a vertical axis 1*a*. As will be seen, the stylus 4 involves a straight shank portion 4*a* positioned in the chuck and a terminal portion 4*b* arranged at an angle A' to the axis 1*a*. As will be seen in Figure 4, the point of the needle engages the record at a distance X from the chuck axis 1*a*, and this distance constitutes a moment arm by which the lateral forces exerted on the point of the needle tend to set up torsional movement of the needle about the axis 1*a*. The torsional forces acting on the needle are illustrated by the arrows 5 and 5' in Figure 5. These torsional forces are directly applied to the point of the stylus when used for reproducing purposes, and they are formed by reaction forces when the stylus is used for recording, especially when recording by embossing. These torsional forces tend to cause the stylus to become loose in the chuck. Furthermore, when the translating unit is used for recording purposes, the fact that the point of the needle is displaced from the axis 1*a* produces a torsional drag on the end of the stylus when the chuck is oscillating about the axis 1*b*, and the point of the stylus lags behind the movement of the chuck axis 1*a* during most of the movement, but has a "whip-like" action at the end of each excursion which results in the point of the needle swinging farther out than it should. This introduces undesirable distortion.

Since the point of my improved stylus engages the record on the axis 1*a* of the chuck, it will be obvious that no torsional forces will be developed on the shank of the stylus or on the chuck 1, and all of the bad effects of such torsional forces are thereby eliminated.

While I prefer to use a simple conical point on the end of the stylus, and when used as a recording stylus the sound groove would be formed by embossing, it will be obvious that the point of the stylus may be formed with a cutting face formed along the axis 1a of the chuck 1, and the stylus could then be used as a cutting stylus without the introduction of torsional forces. The arrow shown below the point 2d in Figure 1 represents the direction of movement of the record when the stylus is used for embossing or when the stylus is used for reproducing purposes. The movement of the record would be in the opposite direction for a stylus provided with a cutting face.

The angle A by which the straight tip portion 2c is inclined to the straight shank portion 2a may vary between 10° to 50° depending upon the material of which the record is formed, but usually will be within the range of 15° to 45°. For most materials, this angle will lie between 24° and 30°, and for an acetate record, the angle may be between 24° and 28°, and the pressure for recording by embossing may be of the order of five ounces. For Vinylite records, the angle A may be somewhat smaller and the pressure may be of the order of two and a half ounces.

In Figure 6 I have shown a modified form of stylus in which a rounded notch 2e is formed in the front half of the stylus at the juncture of the portions 2b and 2c. This notch is cut about half-way through the stylus and, in effect, produces a hinge joint in the stylus to take up any vertical component of motion of the tip of the stylus, and thereby reduces the response of the translating device to the vertical component.

Figures 7 and 8 are greatly enlarged drawings showing side and front views of my stylus provided with a replaceable tip which preferably is formed of a jewel point 2d (such as sapphire) mounted in a metal cup or ring 6 provided with a stem or shank 7 which extends into an axial bore formed in the end of section 2c. The end of section 2c is split by a saw-cut or kerf 8 formed in a vertical plane, and the end portions on opposite sides of the cut are pinched together somewhat, before the tip is inserted, to provide a clamping action on the shank 7.

In Figure 9 the tip is held in the end of the stylus by threaded engagement between the threaded shank 7 and a threaded bore formed in the end portion 2c.

In Figure 10 the tip is held in the stylus by frictional engagement between the tapered shank 7 and a correspondingly tapered bore formed in end section 2c.

I claim:

1. A stylus comprising an integral rod structure formed of stock having a uniform cross-section throughout its length and having a straight shank portion, a straight tip portion arranged at an angle to said shank portion between 10° and 50°, and an intermediate portion connecting said shank and tip portions, said tip portion carrying at its lower end a record-engaging point having its apex located on the axis of said shank portion.

2. A stylus for use in a sound translating unit having a vertical chucking axis, comprising an integral rod structure formed of stock having a uniform cross-section throughout its length and having a straight shank portion arranged coaxially with said chucking axis, a straight tip portion arranged at an angle to said chucking axis, and an intermediate portion joining said shank and tip portions, said tip portion having a pointed end terminating substantially on said chucking axis.

3. A stylus comprising an integral rod structure formed of stock having a uniform cross-section throughout its length and having a straight shank portion and a straight tip portion arranged at an angle to said shank portion of the order of 30 degrees, said tip portion carrying at its lower end a record-engaging point symmetrically formed about the axis of said tip portion and having its apex located on the axis of said shank portion.

4. A stylus formed of round stock material of uniform diameter throughout its length and having a straight shank portion at the butt end thereof, a straight tip portion arranged at an angle to the axis of said shank portion between 15° and 45°, said tip portion having a conical end symmetrically formed about the axis of the tip portion and terminating on the axis of said shank portion.

5. A stylus comprising an integral rod structure formed of stock having a uniform cross-section throughout its length and having a straight shank portion and a straight tip portion arranged at an angle to the axis of said shank portion of substantially 26°, said tip portion having a conical end formed symmetrically about the axis of said tip portion and terminating on the axis of said shank portion.

6. A stylus comprising an integral rod structure formed of stock having a uniform cross-section throughout its length and having a straight shank portion, a straight tip portion arranged at an angle to said shank portion and an intermediate portion connecting said shank and tip portions, said tip portion having a bore formed in the lower end thereof, and a replaceable tip supported in said bore comprising a jewel point mounted with the tip thereof substantially on the axis of said shank portion and having a mounting stem releasably secured in said bore.

7. A stylus according to claim 6 wherein the end of the tip portion of the stylus is split, and the two halves of the split portion are crimped together to exert a clamping action on the stem of the replaceable tip.

8. A stylus according to claim 6 wherein the replaceable tip is secured to the tip portion of the stylus by a threaded connection between the stem of the tip and the walls of said bore.

9. A stylus according to claim 6 wherein the stem of the replaceable tip is tapered and is held in position by frictional engagement with the walls of the bore which is correspondingly tapered.

DONALD J. BAKER.

REFERENCES CITED

The following references are of record in the file of this patent:

UNITED STATES PATENTS

| Number | Name | Date |
|---|---|---|
| 881,594 | Konigstein | Mar. 10, 1908 |
| 1,739,201 | Ahlstrom | Dec. 10, 1929 |
| 2,438,111 | Campbell | Mar. 23, 1948 |
| 2,455,913 | Bauer | Dec. 14, 1948 |

FOREIGN PATENTS

| Number | Country | Date |
|---|---|---|
| 350,887 | Great Britain | June 18, 1931 |